Jan. 6, 1970  R. D. RENSHAW  3,488,021
ESCAPE SYSTEM MODULE FEED AND RELEASE MECHANISM
Filed Feb. 19, 1968  4 Sheets-Sheet 1

INVENTOR.
RAMON D. RENSHAW
BY Robert O. Richardson
- ATTORNEY -

INVENTOR.
RAMON D. RENSHAW
BY Robert O. Richardson
—ATTORNEY—

United States Patent Office 3,488,021
Patented Jan. 6, 1970

3,488,021
ESCAPE SYSTEM MODULE FEED AND
RELEASE MECHANISM
Ramon D. Renshaw, Huntington Beach, Calif., assignor to McDonnell Douglas Corporation, a corporation of Maryland
Filed Feb. 19, 1968, Ser. No. 706,336
Int. Cl. B64d 17/00
U.S. Cl. 244—137                                    9 Claims

ABSTRACT OF THE DISCLOSURE

An emergency escape system in an aircraft for aircrewmen working without benefit of powered ejection seats or without wearing a harness for quick attachment to a parachute. Through use of an automatic module advance dispenser mechanism for a series of parachutes and modules stored under the aircraft cabin floor, crewmen may pass through an opening in the bottom of the airplane and into a module containing oxygen, life raft, impact bag and other essentials in a fully encapsulated "cocoon." A parachute attached to the module opens and maintains the module within a safe descent velocity.

RELATED INVENTIONS

This application relates to copending application for Aircrew Escape and Survival System, S.N. 691,457, filed Dec. 18, 1967, by Robert G. McIntyre, now U.S. Patent No. 3,438,601.

BACKGROUND OF THE INVENTION

For normal manual bailout as a means of escape from an aircraft in an emergency, an aircrewman must wear his equipment so that he may be ready to escape when an emergency occurs. However, the wearing of parachutes, life preservers, survival packs, oxygen sets, and exposure suits are not compatible with personal comfort or the ability to work efficiently over a long period of time. Under normal, unhurried circumstances, it is not difficult to put on a parachute and other necessary items of equipment, but under circumstances of fire, smoke, poor visibility, aircraft maneuvers, injuries, panic, or confusion, the ability of the aircrew to put on their equipment may be drastically impaired, and the time required to do this becomes incompatible with the emergency situation.

SUMMARY OF THE INVENTION

The airscrew escape and survival system, as described in the above referenced copending patent application, provides for a rapid escape of aircrewmen. The escape recovery and survival equipment for each crewman is stowed beneath the aircraft floor, and each crewman is automatically encapsulated in his equipment as he passes through an escape exit. The escape system module feed and release mechanism of the present invention is designed to feed, deploy and release the escape modules set forth and described in the above referenced application. This mechanism is automatic in operation and is powered by a compressed air supply independent from the aircraft source. Because of its design, a man cannot enter a module until it is fully deployed over the escape exit. Because the release mechanism is actuated by the upper flaps, the module cannot be released until a man has passed the upper flaps and is completely enclosed in the module. No further actuation of this system can take place until the man module has left the escape exit and the lower flaps have returned to their original position. After the man module has left the escape exit, the mechanism is free to recommence the sequence of module deployment.

Briefly, there is a storage area adjacent the opening in an aircraft in which a plurality of modules are stored. A mechanical means moves the closest module over the opening. The fore and aft portions are retained on opposite sides so that the module will receive an object dropping through the opening. A retaining means holds these portions in place across the opening until the module receives the object. This, then, causes a release means to release the retaining means and permit egress of the module and object from the aircraft. A recycling means is responsive to the egress of the module and, upon egress, positions the next module over the opening to receive the next object, and also moves the rest of the modules forward by a module thickness to await their subsequent positioning over the opening.

The apparatus of the present invention is one form of apparatus suitable for providing a rapid escape for aircrewmen as set forth in the copending application.

BRIEF DESCRIPTION OF THE DRAWINGS

For a more complete understanding of the structure and operation in the practice of this invention, reference is now had to the drawings wherein:

FIGURES 6 and 7 are elevation views showing in greater detail the interrelation of certain structural parts.

DESCRIPTION OF ILLUSTRATED EMBODIMENT

Figure 1:
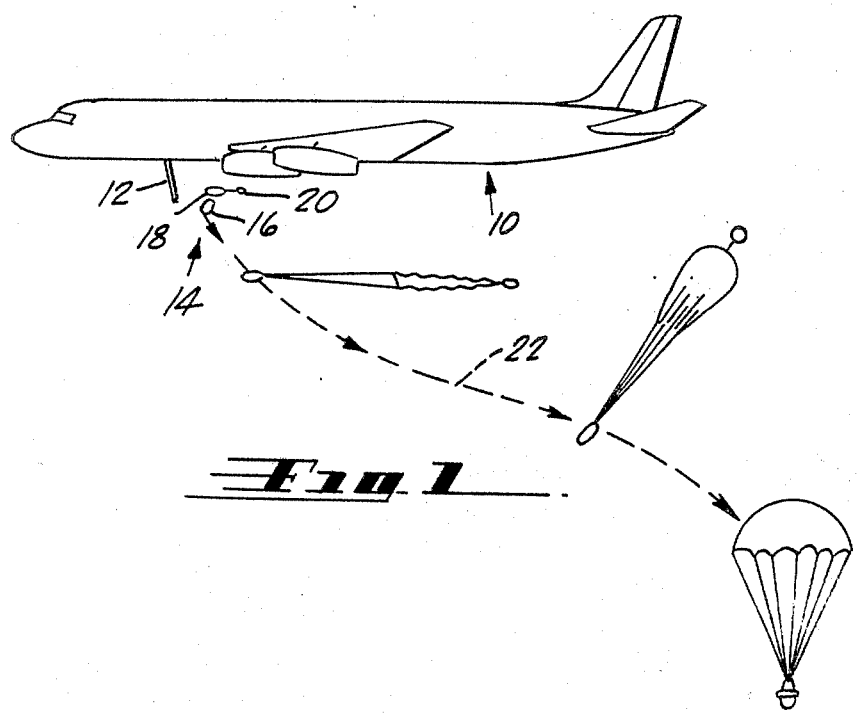
FIGURE 1 is a pictorial illustration of the different positions of the escape module after it leaves the aircraft.

Referring to FIGURE 1, the escape system module feed and release mechanism is intended for use in an aircraft 10 having a door 12 in the bottom thereof which is pivotally mounted in such a manner as to form a windbreak as an escape module 14 passes therefrom. The escape module consists of an enclosed cocoon 16 to which is attached the main parachute 18 from which extends a pilot chute 20. As the unit falls from the aircraft, it follows the path shown by dotted lines 22 until the parachute is fully open, and the module is suspended therefrom and the unit settles to earth.

Figure 2:
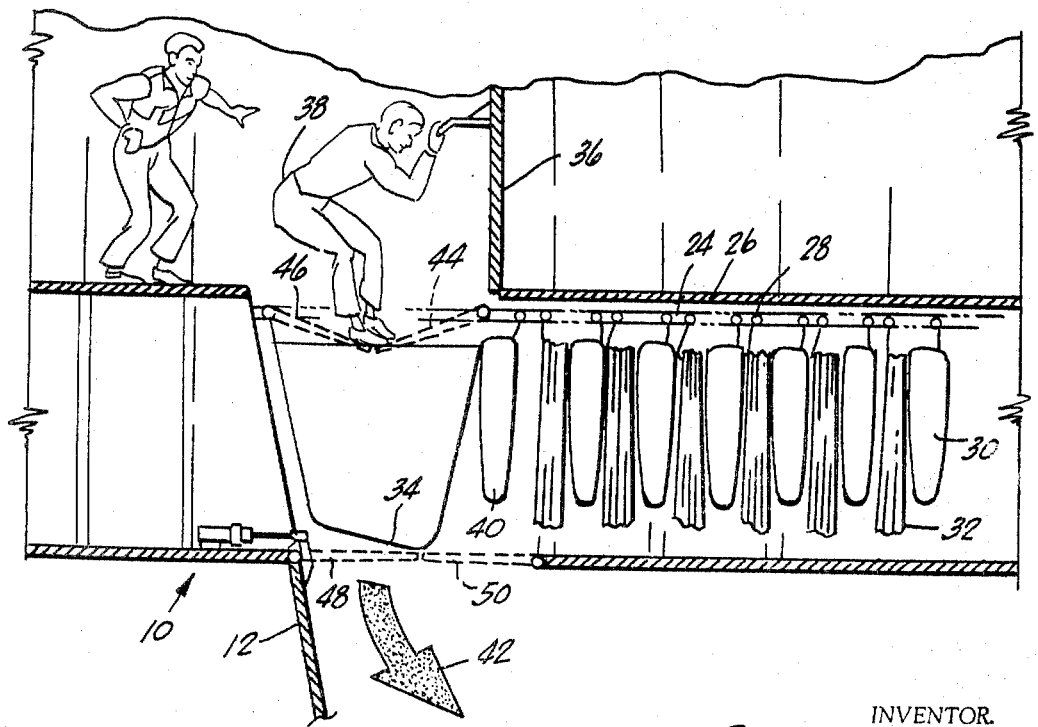
FIGURE 2 is a schematic illustration showing the storage area for the cocoons and the parachutes adjacent the escape exit and wherein a module is in position to receive a man making his escape.

As shown in FIGURE 2, a trackway 24 is mounted under the floor 26 of aircraft 10 for receiving a plurality of rollers 28 upon which are suspended modules 30 and parachutes 32. In accordance with the apparatus of the present invention, these modules pass to the open position, such as module 34, over an escape opening defined by open doors 36 and 12. With a module in this position, an aircrewman 38 drops into it, at which time the module and its accompanying parachute 40 are released and permitted to pass from the aircraft 10 as shown by the arrow 42. Upper flaps 44, 46 and lower flaps 48, 50 pivot downwardly and return to original position to initiate actuation of various movements of the apparatus.

Figure 3:
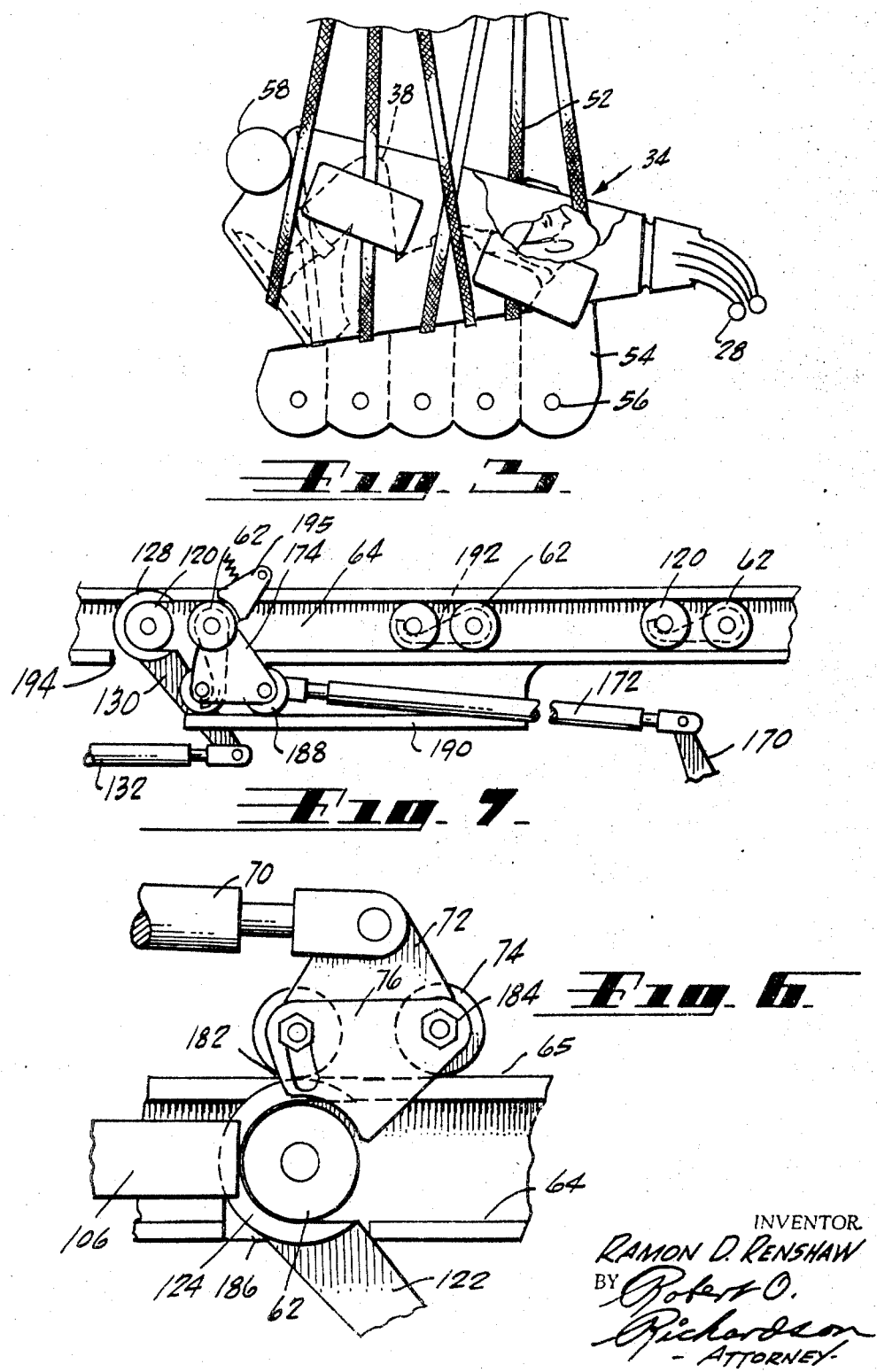
FIGURE 3 is a schematic illustration showing one form of escape cocoon.

In FIGURE 3 there is shown one form of module 34 suspended from a parachute by means of straps 52. This module is adapted to encapsulate the aircrewman 38 so that he is positioned on his back. A base 54 provides a support for the occupant and is constructed of a crushable material to give backup cushioning on landing. Blowout plugs 56 are provided such that impact will be cushioned progressively. A plurality of flotation units 58 are provided so that if the unit lands in water, the occupant will be in a slightly reclining position. A transparent window is provided for appropriate viewing. Within the module, but not shown, are survival equipments, such as oxygen, food, signalling equipment and other apparatus, as desired.

Figure 4:
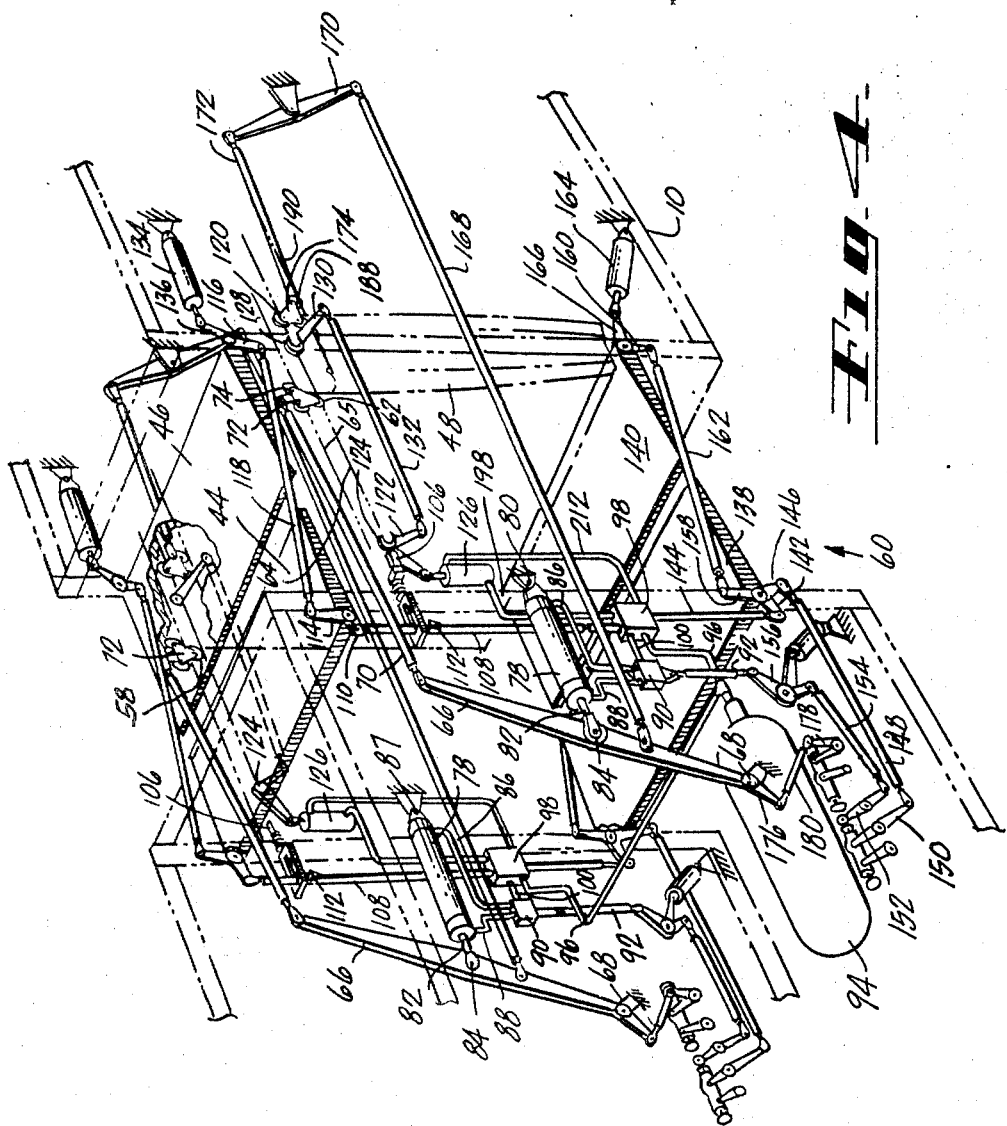
FIGURE 4 is a perspective view of one form of apparatus for use in moving a conveyor line of escape modules into position for use.
Figure 5:
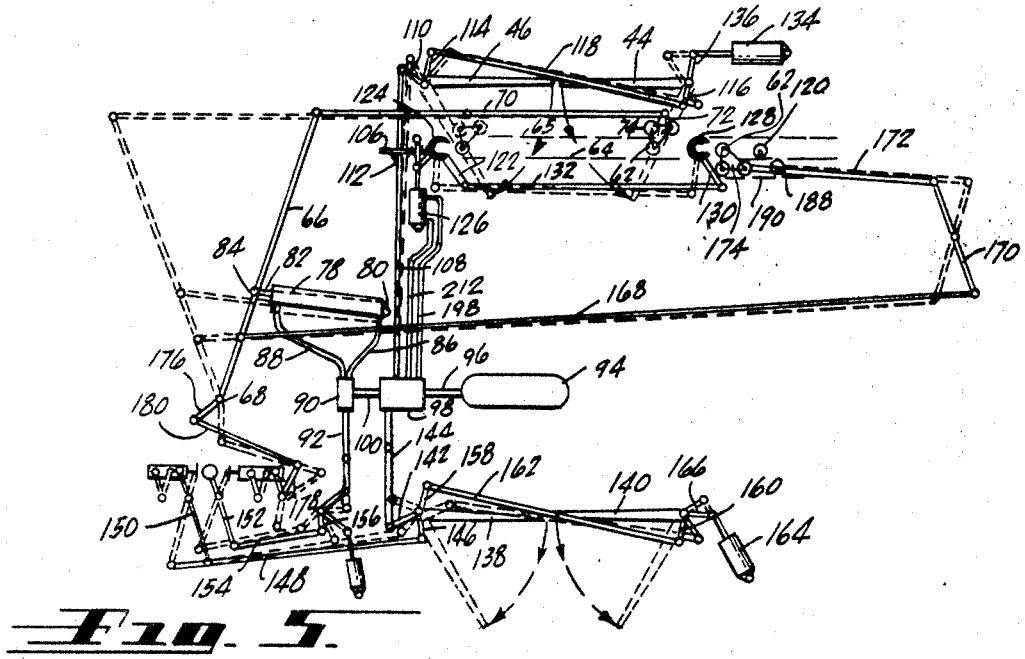
FIGURE 5 is a side view illustrating the relationship and movement of the various parts.

The apparatus shown in FIGURES 4 and 5 are for the purpose of feeding, deploying, and releasing the escape modules. The main functions of the mechanisms to control the modules are to position a module over the escape opening to receive a crewman, or cargo, advance the modules as soon as one is released and to position another module in the area ready for the next crewman or object to be released. It is automatic in operation and is powered by a compressed gas supply, such as compressed air, independent from the aircraft source. Because of its design, a man cannot enter the escape slide until the module is fully deployed over the aircraft exit. Because the release mechanism is actuated by the upper flaps, the module (not shown) cannot be released until the man is completely enclosed in the module. No further actuation of the feeding and deployment system can take place until the man and module have left the escape slide and the lower flaps have returned to their up position. After the man and module have left the escape slide the mechanism is free to recommence its sequence of further module deployment. The action of the mechanism can be separated into three stages: (1) a long feed or deployment of the module which occurs when the module nearest the escape exit is expanded over the escape exit openings; (2) the release, which occurs after the man is correctly positioned in the module; (3) the short feed, when the remaining modules are all advanced toward the exit a distance of one module thickness. The short feed and long feed mechanisms are intercoupled and are driven in such a manner that when the short feed is in its work stroke, the long feed is returning to position and vice versa. A safety feature requires that a module be deployed over the opening before upper flaps can open to permit a man to drop through, the module remains over the opening until the man is safely encapsulated, and no recycling of the operation occurs until the man-module has passed the lower flaps.

The apparatus shown in FIGURES 4 and 5 is in a position to deploy a module over the escape opening 60 in the aircraft 10. This is done by moving the front rollers 62 of the module or cocoon across the opening 60 which is under the roller trackway 64, shown in phantom lines. Structure for performing this function includes a main drive lever 66 pivotally connected to the aircraft at pivot point 68. The other end of main drive lever 66 is pivotally connected to a carriage driver 70 having a carriage 72 connected at its other end. This carriage is mounted on rollers 74 which move along a trackway 65. Pivotally mounted on carriage 72 is a cam 76 (shown in FIGURE 6) which is engageable with the structure at the forward portion of the bag for the purpose of moving rollers 62 along the trackway 64, toward the left in FIGURES 4 and 5. A main drive jack 78 is connected at pivot point 80 to the aircraft structure and includes an actuating piston rod 82 pivotally connected to the main drive lever 66 at pivot point 84. This jack is actuated by fluid pressure and has a pressure conduction line 86 for expanding the piston rod 82 outwardly and another line 88 for causing the piston 82 to withdraw into the cylinder of jack 78. These lines are connected to a direction valve 90 which is controlled by the position of selector rod 92 in determining which line 86 or 88 will be connected to the actuation pressure source 94. The pressure source 94 is connected to the direction valve 90 through conductor 96, main control valve 98 and conductor 100. Pressure source 94 preferably is a gas pressure source independent of the aircraft pressure sources.

In order to ensure that a crewman will not drop down into the slide without the benefit of a bag to catch him, upper flaps 44 and 46 are provided which will not open until the bag has been extended over the opening 60 underneath. When the front roller 62 of the bag is in its extended position, it will move a spring-positioned bumper 106 which, when depressed by the roller 62, will permit the upper flaps 44, 46 to drop downwardly and open. This upper flap locking mechanism consists of a bar 108 pivotally connected to a crank 110 affixed to flap 44. Bar 108 has a projection 112 which abuts against the lower surface of bumper 106. This bumper is moved by roller 62 at the completion of the long stroke so that projection 112 is free to move upwardly and thus permit flap 144 to drop down. Suitable linkage is provided to cause flap 46 to operate in a similar manner, i.e., rise and fall with flap 44. This linkage consists of an upstanding crank 114 on flap 44 and downwardly extending crank 116 on flap 46 with an interconnecting rod 118. With this linkage, flap 46 is held horizontally when flap 44 is horizontal and flap 46 is permitted to drop when flap 44 drops. When the upper flaps drop, locking rod 108 also actuates a piston in the main control valve 98 which moves the piston to a flap-down position, cutting off pressure to the direction valve 90 and disabling main drive jack 78.

Provision is made to hold the forward rollers 62 and aft rollers 120 of the bag across the escape opening under flaps 44, 46 until the crewman is in the bag and ready for release. This mechanism consists of a carnk 122, including a stop cam 124, which is actuated by a release jack 126. A release cam 128 is rotatably mounted adjacent the trackway 64 to engage and disengage with the aft rollers of the bags. This cam has a lever arm 130 which is connected to an actuating rod 132, which in turn is pivotally connected to the crank 122. Locking rod 108 is actuated by the forward rollers 62 striking bumper 106 to permit the upper flaps 44, 46 to fall downwardly, and rod 108 cuts off the air supply to the main jack 78 through the direction valve 90. The air supply to the release jack 126 is in the hold position which means that cam 124 and cam 128 retain the front and back rollers 62 and 120 of the bag until actuated for release.

After the upper flaps 44 and 46 have been opened to permit the crewman to go down into the bag, the flaps are then returned to their closed position by return spring box 134 which is connected to flap 46 through crank 136. The entry of the crewman into the module causes the lower flaps 138, 140 to move downwardly. As the man passes past the upper flaps 44, 46 the flaps return to their original position and the main control valve 98 is activated by rod 108 to supply air to the release side 212 of the release jack 126. Air supply to the main drive jack 78 remains cut off. Pressure to the release side of release jack 126 causes the jack to rotate cams 124 and 128 and the man-module is free to fall from the aircraft.

As the man-module passes through the lower flaps 138, 140, the rotation of the lower flaps causes the apparatus to make ready for the next escapement. This is done by actuating the main control valve 98 and reversing the main jack direction valve 90, making piston rod 82 shorten into main jack 78 to commence a new cycle. Main control valve 98 is actauted by means of a crank 142 affixed to lower flap 138 and a connecting actuator 144 operably connected to the main control valve 98. The main jack direction valve 90 is actuated by selector rod 92 which is operable by lower flap 138 through crank 146, connecting link 148, pivotal lever 150, pivotally mounted toggle 152, link 154 and crank 156.

When lower flap 138 moves, lower flap 140 moves with it through cranks 158, 160, and connecting rod 162. Spring return box 164 connected to crank 166 on flap 140 returns the lower flaps to horizontal position as shown. When the lower flap 138 returns to its normal position after the man-module has passed through, it returns the main control valve 98 to its original position. Gas is supplied to the hold side 198 of the release jack 126 and cams 124, 128 are rotated to receive the fore and aft rollers of the next module and prevent them from leaving the trackway along which they are moved. The gas supply is reconnected to the main jack drive 78.

As piston rod 82 extends into jack 78, the short feed is actuated along with the long feed. The short feed moves the stacked modules forward by one module thickness. The short feed consists of an actuating rod 168 pivotally connected to a direction reversing pivotal lever 170 having at its other end a cam actuating rod 172. This rod moves cam 174 behind the next aft roller for its movement forward to release cam 76.

A crank 176 operates with drive arm 66 and is connected to crank 178 through a linkage 180. As the main jack 78 shortens, that is, the long feed moves into position to get the front rollers of the bag for movement over the opening and the short feed has moved the modules forward by one module thickness, the toggle 152 is caused to rotate counterclockwise to the position shown in the drawing. This moves selector rod 92 up to reverse the flow of valve 90 and the sequence starts again.

In FIGURE 6 there is an enlarged view showing how front roller 62 is pushed along track 64 by cam 76 until it moves bumper 106 (permitting rod 108 to move upwardly) and engages cam 124. Cam 76 is on carriage 72 having rollers 74 engageable with track 65. Carriage 72 is moved along track 65 by carriage driver 70. As can readily be seen, cam 76 with its arcuate slot 182 and pivotal connection 184 may pass over front roller 62 in its left-to-right movement, and then push the front roller axle ahead of it in its right-to-left movement of the long stroke to position the module over the escape opening. Cam 124 is adapted to be rotated by arm 122, upon release, to enable the roller to drop through opening 186 on track 64 to free the front portion of the module.

In FIGURE 7 there is shown how the aft roller 120 is held for release and how the short stroke mechanism moves the modules forward for use. At the commencement of the short stroke to move the modules, carriage 174 is at the right of its position as shown and the carriage rollers 188 are at the right end of track 190. Upon activation of the short stroke, push rod 172 moves the carriage 174 to the left, to the position shown, moving the forward module roller 120 also to the left. A no return cam 195 positions the front roller 62 of the next module for the long stroke operation. Hook 192 between the aft roller of the previous module and the front roller 62 of the next module disengages so that the aft roller 120 held by cam 128 may be free to drop through opening 194 upon release. Actuating rod 132 connected to lever arm 130 rotates cam 128 upon release.

Although not shown, it should be understood that the front rollers 62 are of less distance apart than the aft rollers 120. This permits them to be moved past the aft roller retaining cams 128, during the long stroke, and to be moved over the escape opening to engage cams 124.

Figure 8:
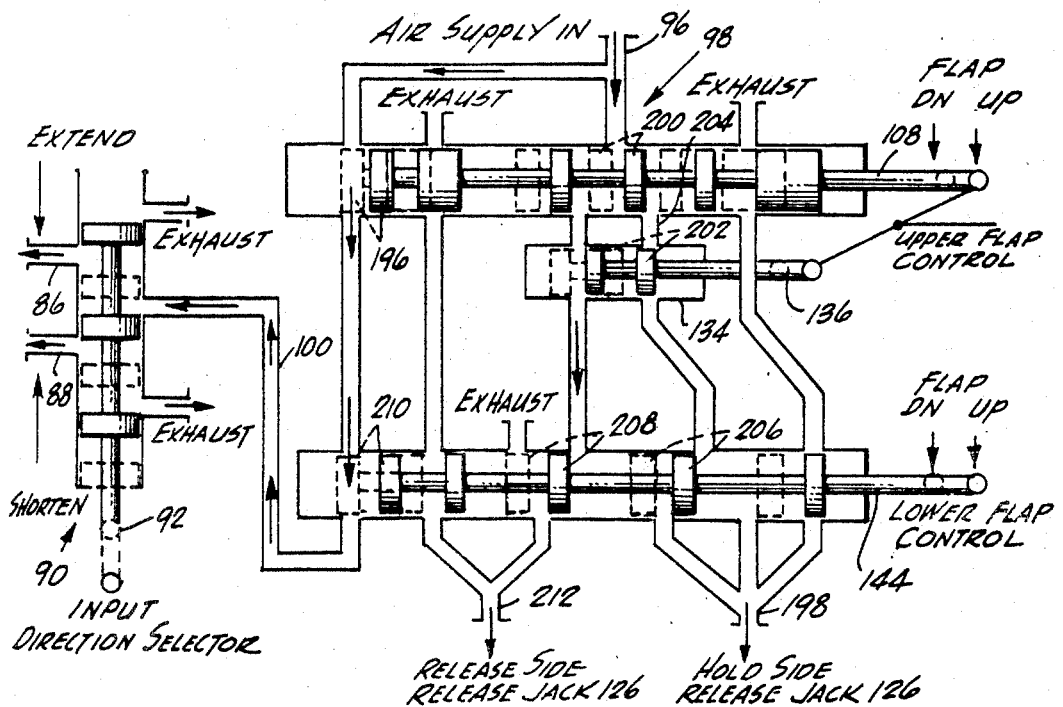
FIGURE 8 is a schematic illustration of the pneumatic system used in connecting various apparatus to the power source.

In FIGURE 8 there is shown a schematic illustration of the valve arrangement for diverting the air pressure during the operation of the apparatus. Commencing with the long stroke for pulling a module over the escape opening and the short stroke wherein the short stroke carriage is in position to move the modules one module thickness closer to the opening, the air supply passes through conductor 96, through main control valve 98, through conductor 100, through direction selector valve 90 and out the "extend" conductor 86 to the main jack 78. When the long stroke is completed, permitting the upper flaps 44, 46 to drop down, bar 108 moves to the flap down position shown in dashed lines. This causes spool 196 in valve 98 to block the air supply path to conductor 100 and thus hold main drive lever 66 in the extended position.

When the upper flaps move down, the air supply to release jack 126 stays on the hold side 198 to keep the module from falling until the man is safely inside. Spool 200 is to the left of the air input conductor 96, as is spool 202 to the left of path 204, to permit air to pass to the hold side 198 of the release jack 126. As the man-module passes through the lower flaps, the lower flap control 144 moves to the lower flap down position. Spool 208 is moved to the left to permit air passage to the release side 212. However, spool 200 prevents air to the release side until the upper flaps are returned to the up position, upon clearance by the man past the upper flaps. When this occurs, spool 200 is moved from the air path and the release side 212 of the release jack 126 is activated. The holding cams 124, 128 are rotated and the man-module is free to fall. When the man-module passes the lower flap, rod 144 moves to the flap up position, moving spool 210 from the air path to the selector valve 90. The lowering and subsequent return of the lower flaps activates rod 92 which reverses the direction selector valve 90 and air enters the "shorten" side 88 to recycle the long stroke again.

From the foregoing description other modifications will readily occur to those skilled in the art, and it is to be understood that these variations and deviations are to be considered as part of this invention.

I claim:

1. In an aircraft having a frame structure defining an egress opening for objects, an object supporting module feed and release system comprising:
    a storage area adjacent said opening and adapted to receive a plurality of object supporting modules, said modules being movable from said area and having leading fore and trailing aft portions;
    mechanical means for moving one of said modules to a position gravitationally overlying said opening;
    retaining means engageable with said fore and aft portions of said module for retaining said module in said position overlying said opening;
    coupling means operatively coupled to said mechanical means for moving modules intended for subsequent use within said area and into positions for sequential disposition thereof by said mechanical means;
    interrupting means further operatively coupled to said mechanical means for interrupting passage of objects in the direction of egress through said opening in the absence of a module located in said overlying position;
    release means responsive to the reception of an object by said module for releasing said retaining means, thereby permitting egress of said module and object from the aircraft;
    said mechanical means including a main drive lever;
    a main jack cylinder having a piston rod therein connected to said main drive lever,
    suitable linkage connected to said lever to push said fore portion of said module forwardly upon extension of said piston rod outwardly in said cylinder; and
    power means selectively moving said piston rod inwardly and outwardly of said cylinder.

2. An object supporting module feed and release system as set forth in claim 1,
    said retaining means including rotatable cams for receiving said portions and means for retaining said cams in non-rotatable position until released for rotation.

3. An object supporting module feed and release system as set forth in claim 2,
    said interrupting means including an upper flap,
    means retaining said flap in position over said opening, and
    means releasing said retaining means to permit actuation of said flap upon engagement of one of said portions with one of said cams.

4. An object supporting module feed and release system as set forth in claim 1 wherein said coupling means includes a main driver lever,
- a main jack cylinder having a piston rod therein connected to said main drive lever,
- suitable linkage connected to said lever to push said modules toward said opening a distance of approximately the thickness of a module upon extension of said piston rod outwardly in said cylinder, and
- power means selectively moving said piston rod inwardly and outwardly of said cylinder.

5. An object supporting module feed and release system as set forth in claim 1 wherein said release means includes a lower flap extending over said opening, and
- means interconnecting said lower flap with said retaining means for releasing said fore and aft portions upon downward depression of said flap.

6. An object supporting module feed and release system as set forth in claim 1, and
- recycling means responsive to the passage of said module from said opening to initiate action of said mechanical means and said coupling means.

7. An object supporting module feed and release system as set forth in claim 1 wherein said mechanical and coupling means are simultaneously actuable.

8. An object supporting module feed and release system as set forth in claim 1 including links and levers operable to place and retain modules over said opening, position a subsequent module for subsequent use, release the module over said opening after placement of an object therein, place said subsequent module over said opening after release of said module, and
- fluid pressure means for actuating said links and levers.

9. An object supporting module feed and release system as set forth in claim 1,
- said mechanical and coupling means including a main drive lever, a main jack cylinder having a piston rod therein connected to said main drive lever, fluid pressure means for moving said piston rod outwardly of said cylinder, linkage connected to said lever to push said fore portion across said opening, and linkage connected to said lever to push said successive modules toward said opening a distance approximately the thickness of a module,
- said retaining means including rotatable cams for receiving said portions to retain said module across said opening and means for retaining said cams in non-rotatable position until released for rotation,
- said interrupting means including a flap held across said opening by a retaining means and release means for releasing said retaining means to permit actuation of said flap upon engagement of one of said portions with one of said cams,
- said release means including a lower flap extending over said opening and means interconnecting said lower flap with said cams for rotation thereof upon downward depression of said lower flap.

References Cited

UNITED STATES PATENTS

| | | | |
|---|---|---|---|
| 3,438,601 | 4/1969 | McIntyre | 244—137 |
| 2,389,160 | 11/1945 | Manson et al. | 244—137 |
| 2,426,862 | 9/1947 | Cunningham | 244—137 |
| 2,801,062 | 7/1957 | Leahy | 244—137 |

MILTON BUCHLER, Primary Examiner

T. W. BUCKMAN, Assistant Examiner

U.S. Cl. X.R.

141—317